(12) United States Patent
Shao

(10) Patent No.: US 11,391,422 B2
(45) Date of Patent: *Jul. 19, 2022

(54) LIGHT STRING PACKAGE STRUCTURE

(71) Applicant: BLOOMING INTERNATIONAL LIMITED, British West Indies (AI)

(72) Inventor: Shu-Fa Shao, Taipei (TW)

(73) Assignee: Blooming International Limited, British West Indies (AI)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,231

(22) Filed: Jan. 8, 2021

(65) Prior Publication Data
US 2021/0270429 A1 Sep. 2, 2021

Related U.S. Application Data

(63) Continuation of application No. 16/751,064, filed on Jan. 23, 2020, now Pat. No. 10,914,437.

(30) Foreign Application Priority Data

Sep. 27, 2019 (CN) .......................... 201910924211.7

(51) Int. Cl.
*F21S 4/10* (2016.01)
*F21V 23/00* (2015.01)
(Continued)

(52) U.S. Cl.
CPC ................ *F21S 4/10* (2016.01); *F21V 5/043* (2013.01); *F21V 19/0015* (2013.01);
(Continued)

(58) Field of Classification Search
CPC ....................................................... F21S 4/10
See application file for complete search history.

(56) References Cited

U.S. PATENT DOCUMENTS

| 4,675,575 A | 6/1987 | Smith et al. |
| 4,761,720 A | 8/1988 | Solow |

(Continued)

FOREIGN PATENT DOCUMENTS

| CN | 200982547 Y | 11/2007 |
| CN | 201121811 Y | 9/2008 |

(Continued)

*Primary Examiner* — William N Harris
(74) *Attorney, Agent, or Firm* — Christensen, Fonder, Dardi & Herbert PLLC

(57) ABSTRACT

A lighting structure including a light-transmitting cap, a wire, a light emitting diode (LED) and a transparent adhesive. Two guide pieces project in parallel and protrude from the bottom of a body of the light-transmitting cap, and an opening of the body is located between the two guide pieces. Two lugs extend from the body, and correspond to two ends of a guide trench between the two guide pieces. A soldering surface of the LED is soldered on a soldering section of the wire. The transparent adhesive wraps around the soldering section, the guide trench and the two lugs, and wraps around a light emitting surface of the LED. The light-transmitting cap covers the LED with the LED at the opening. The soldering section is located between the two guide pieces, and the transparent adhesive attaches the LED to the light-transmitting cap.

14 Claims, 13 Drawing Sheets

(51) Int. Cl.
 *F21V 5/04* (2006.01)
 *F21V 19/00* (2006.01)
 *F21Y 115/10* (2016.01)
 *F21V 8/00* (2006.01)

(52) U.S. Cl.
 CPC .......... *F21V 23/001* (2013.01); *G02B 6/0005* (2013.01); *F21Y 2115/10* (2016.08)

(56) References Cited

U.S. PATENT DOCUMENTS

| | | |
|---|---|---|
| 4,812,956 A | 3/1989 | Chen |
| 4,908,743 A | 3/1990 | Miller |
| 5,109,324 A | 4/1992 | Ahroni |
| 5,150,964 A | 9/1992 | Tsui |
| 5,499,174 A | 3/1996 | Lin |
| 5,834,901 A | 11/1998 | Shen |
| 5,842,778 A | 12/1998 | Maring |
| 6,027,952 A * | 2/2000 | Liu .................. F21V 21/002  257/E25.028 |
| 6,155,695 A | 12/2000 | Sealy |
| 6,347,965 B1 | 2/2002 | Pan |
| 6,481,875 B1 | 11/2002 | Bryant |
| 6,609,814 B2 | 8/2003 | Ahroni |
| 6,777,891 B2 | 8/2004 | Lys et al. |
| 6,914,194 B2 | 7/2005 | Fan |
| 7,088,904 B2 | 8/2006 | Ryan, Jr. |
| 7,160,140 B1 | 1/2007 | Mrakovich et al. |
| 7,186,005 B2 | 3/2007 | Hulse |
| 7,235,815 B2 | 6/2007 | Wang |
| 7,883,261 B2 | 2/2011 | Yu |
| 7,926,978 B2 | 4/2011 | Tsai |
| 8,070,347 B1 | 12/2011 | Lin |
| 8,371,716 B2 | 2/2013 | Shen et al. |
| 8,397,381 B2 | 3/2013 | Tsai |
| 8,469,750 B2 | 6/2013 | Chen |
| 8,562,175 B2 | 10/2013 | Chen |
| 8,568,015 B2 | 10/2013 | Chen |
| 8,592,845 B2 | 11/2013 | Chen |
| 8,608,342 B2 | 12/2013 | Chen |
| 8,616,735 B2 | 12/2013 | Van Dyn Hoven |
| 8,622,576 B2 | 1/2014 | Zhang |
| 8,651,700 B2 * | 2/2014 | Peng .................. F21V 19/0055  362/249.06 |
| 8,840,279 B2 | 9/2014 | Allen et al. |
| 8,853,721 B2 | 10/2014 | Chen |
| 9,788,384 B1 | 10/2017 | Harris |
| 9,845,925 B2 | 12/2017 | Chen |
| 10,184,654 B1 | 1/2019 | Chen |
| 10,205,073 B2 | 2/2019 | Altamura |
| 10,288,235 B1 | 5/2019 | Chen |
| 10,288,236 B1 | 5/2019 | Chen |
| 10,533,738 B2 | 1/2020 | Leung et al. |
| 10,578,260 B1 | 3/2020 | Chen |
| 10,624,166 B1 | 4/2020 | Shao |
| 10,697,598 B1 | 6/2020 | Chen et al. |
| 10,845,036 B2 | 11/2020 | Shao et al. |
| 10,914,437 B1 | 2/2021 | Shao |
| 2002/0027778 A1 | 3/2002 | Ko |
| 2003/0063463 A1 | 4/2003 | Sloan et al. |
| 2004/0012950 A1 | 1/2004 | Pan |
| 2004/0080281 A1 | 4/2004 | Pan |
| 2004/0090770 A1 | 5/2004 | Primeau |
| 2004/0165384 A1 | 8/2004 | Allen |
| 2004/0246718 A1 | 12/2004 | Fan |
| 2005/0018424 A1 | 1/2005 | Popovich |
| 2005/0174065 A1 | 8/2005 | Janning |
| 2006/0158878 A1 | 7/2006 | Howell |
| 2006/0221609 A1 | 10/2006 | Ryan, Jr. |
| 2007/0015396 A1 | 1/2007 | Mrakovich et al. |
| 2007/0177402 A1 | 8/2007 | Wu |
| 2007/0230174 A1 | 10/2007 | Hicks et al. |
| 2007/0262725 A1 | 11/2007 | Koren |
| 2007/0279920 A1 | 12/2007 | Lin |
| 2008/0049424 A1 | 2/2008 | Want |
| 2008/0084695 A1 | 4/2008 | Hsu |
| 2008/0084702 A1 | 4/2008 | Cheung |
| 2008/0094828 A1 | 4/2008 | Shao |
| 2008/0174995 A1 | 7/2008 | Tong |
| 2008/0218092 A1 | 9/2008 | Chang et al. |
| 2009/0147509 A1 * | 6/2009 | Reed ................... F21V 21/002  362/234 |
| 2009/0154156 A1 | 6/2009 | Lo et al. |
| 2009/0278463 A1 | 11/2009 | Tang |
| 2009/0302771 A1 | 12/2009 | Peng |
| 2010/0001664 A1 | 1/2010 | Shih |
| 2010/0157598 A1 | 6/2010 | Tsai |
| 2011/0062875 A1 | 3/2011 | Altamura |
| 2011/0074300 A1 | 3/2011 | Hsu |
| 2011/0148311 A1 | 6/2011 | Neuman |
| 2011/0194292 A1 * | 8/2011 | Tsai .................. F21S 4/10  362/311.02 |
| 2011/0215368 A1 | 9/2011 | Chen |
| 2011/0228535 A1 | 9/2011 | Shao |
| 2011/0286223 A1 | 11/2011 | Chen |
| 2011/0303939 A1 | 12/2011 | Chen |
| 2011/0305022 A1 | 12/2011 | Chen |
| 2011/0310601 A1 | 12/2011 | Shao |
| 2012/0039070 A1 | 2/2012 | Shen et al. |
| 2012/0075863 A1 | 3/2012 | Chen |
| 2012/0275157 A1 | 11/2012 | Hsu |
| 2013/0058079 A1 | 3/2013 | Dellian et al. |
| 2013/0078847 A1 | 3/2013 | Chen |
| 2013/0181232 A1 | 7/2013 | Jeromerajan et al. |
| 2013/0249417 A1 | 9/2013 | Verlinden |
| 2013/0299860 A1 | 11/2013 | Mineshita |
| 2013/0301246 A1 | 11/2013 | Chen |
| 2014/0268689 A1 | 9/2014 | Chen |
| 2014/0268818 A1 | 9/2014 | Huang et al. |
| 2014/0292214 A1 | 10/2014 | Hung et al. |
| 2014/0355277 A1 | 12/2014 | Lin |
| 2015/0008835 A1 | 1/2015 | Sugiura et al. |
| 2015/0117001 A1 | 4/2015 | Fan |
| 2016/0047516 A1 | 2/2016 | Taylor |
| 2016/0123566 A1 | 5/2016 | Leung |
| 2016/0183338 A1 | 6/2016 | Loomis et al. |
| 2016/0186940 A1 | 6/2016 | Del Castillo et al. |
| 2016/0341408 A1 | 11/2016 | Altamura |
| 2017/0003003 A1 | 1/2017 | Roos |
| 2017/0023223 A1 | 1/2017 | Tsai |
| 2017/0038055 A1 | 2/2017 | Daniels |
| 2017/0108185 A1 | 4/2017 | He |
| 2017/0295622 A1 | 10/2017 | Harris |
| 2017/0343170 A1 | 11/2017 | Yu et al. |
| 2018/0020519 A1 | 1/2018 | Harris |
| 2018/0020520 A1 | 1/2018 | Harris |
| 2018/0172225 A1 | 6/2018 | Zhao |
| 2018/0172226 A1 | 6/2018 | Zhao |
| 2018/0299084 A1 | 10/2018 | Chien |
| 2019/0234597 A1 | 8/2019 | Zhu |
| 2019/0277458 A1 | 9/2019 | Shao |
| 2019/0335559 A1 | 10/2019 | Shao |
| 2020/0236746 A1 | 7/2020 | Shao |

FOREIGN PATENT DOCUMENTS

| | | |
|---|---|---|
| CN | 201898147 U | 7/2011 |
| CN | 201966240 U | 9/2011 |
| CN | 202613183 U | 12/2012 |
| CN | 203703878 U | 7/2014 |
| GB | 2 454 546 A | 5/2009 |

* cited by examiner

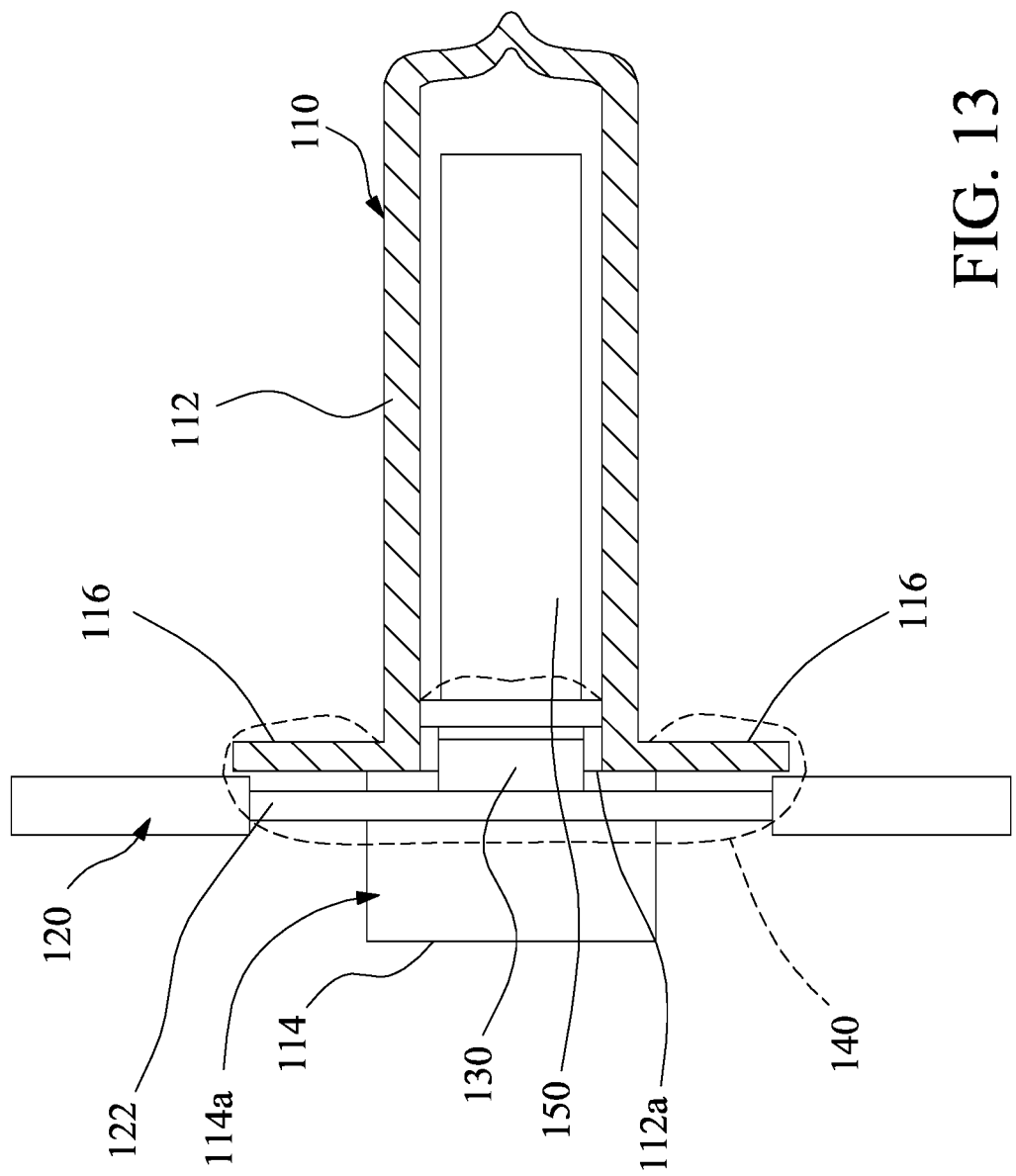

LIGHT STRING PACKAGE STRUCTURE

RELATED APPLICATIONS

The present application is a continuation of U.S. patent application Ser. No. 16/751,064, filed Jan. 23, 2020, which claims priority to Chinese Patent Application No. 201910924211.7, filed on Sep. 27, 2019, all of which are incorporated herein by reference in their entireties.

FIELD OF THE INVENTION

This disclosure relates to a light string, and more particularly relates to a light string package structure.

BACKGROUND

A known light string is a configuration wherein a plurality of light sources are directly soldered on a wire in a spaced manner to form a string-shaped illumination device without a lamp holder in the art. For small light sources, such as bulbs and light emitting diodes (LEDs), it is a frequently used configuration. The light string may be easily configured into any form due to the maintenance of an original winding characteristic of the wire, so as to be suitable for special lighting needs or decorations.

In the art, the LED is directly soldered onto a wire after an insulating layer of the wire is directly removed. The electrode of the light emitting diode is directly soldered on an exposed metal core, and then solder joints are subjected to an insulating process. In the case where a light-transmitting cap is provided, the light-transmitting cap is fixed on a light source in an adhering manner. When the light string is bent considerably, a soldered portion will be also bent sharply. However, the solder usually lacks flexible or bendable properties, so that when the wire is bent significantly, the soldering joint easily fails, which makes the LED fail to emit light.

SUMMARY

In view of the above problem, this disclosure provides a light string package structure, so as to solve problems in the prior art.

This disclosure provides a light string package structure, including a light-transmitting cap, a wire, a light emitting diode and a transparent encapsulating or adhering substance such as an adhesive, epoxy or glue. In an embodiment, the light-transmitting cap includes a body, two guide pieces and two lugs. The interior of the body is hollow, and an opening is formed in the bottom surface of the body to communicate with the interior of the body. The two guide pieces are in parallel and protrude from the bottom of the body. A guide trench is defined between the two guide pieces, and the opening is located between the two guide pieces. The wire has a soldering section with an exposed metal core. The two lugs inversely extend outward from the edge of the bottom of the body, and correspond to two ends of the guide trench. The light emitting diode has a light emitting surface and a soldering surface. The soldering surface is soldered onto the soldering section, and the soldering section is flatly attached to the soldering surface. The transparent glue covers the soldering section to adhere the soldering section to the guide trench and the two lugs, and extends around to wrap the light emitting surface of the light emitting diode. The light-transmitting cap covers the light emitting diode, so that the light emitting diode is located at the opening, and the light emitting surface faces the interior of the body. The soldering section is located between the two guide pieces, and the transparent glue attaches the light emitting diode to the light-transmitting cap.

In one or more embodiments, other portions of the wire are covered by an insulating layer.

In one or more embodiments, the insulating layer is a plastic layer or insulating paint coating layer.

In one or more embodiments, a distance between two ends of the two lugs is equal to or greater than a length of the soldering section.

In one or more embodiments, the transparent glue attaches the soldering section to the two guide pieces and the edge of the opening.

In one or more embodiments, the transparent glue is an ultraviolet-curable adhesive.

By adopting the light string package structure, in addition to providing an optical effect through the light-transmitting cap, the fixing of the soldering section can be reinforced, thereby avoiding a soldering failure of the light emitting diode due to excessive bending of the soldering section in a use process of a light string.

BRIEF DESCRIPTION OF THE DRAWINGS

FIG. 11 to FIG. 13 are cross-sectional exploded diagrams of different application cases of this disclosure.

DETAILED DESCRIPTION

Figure 1:
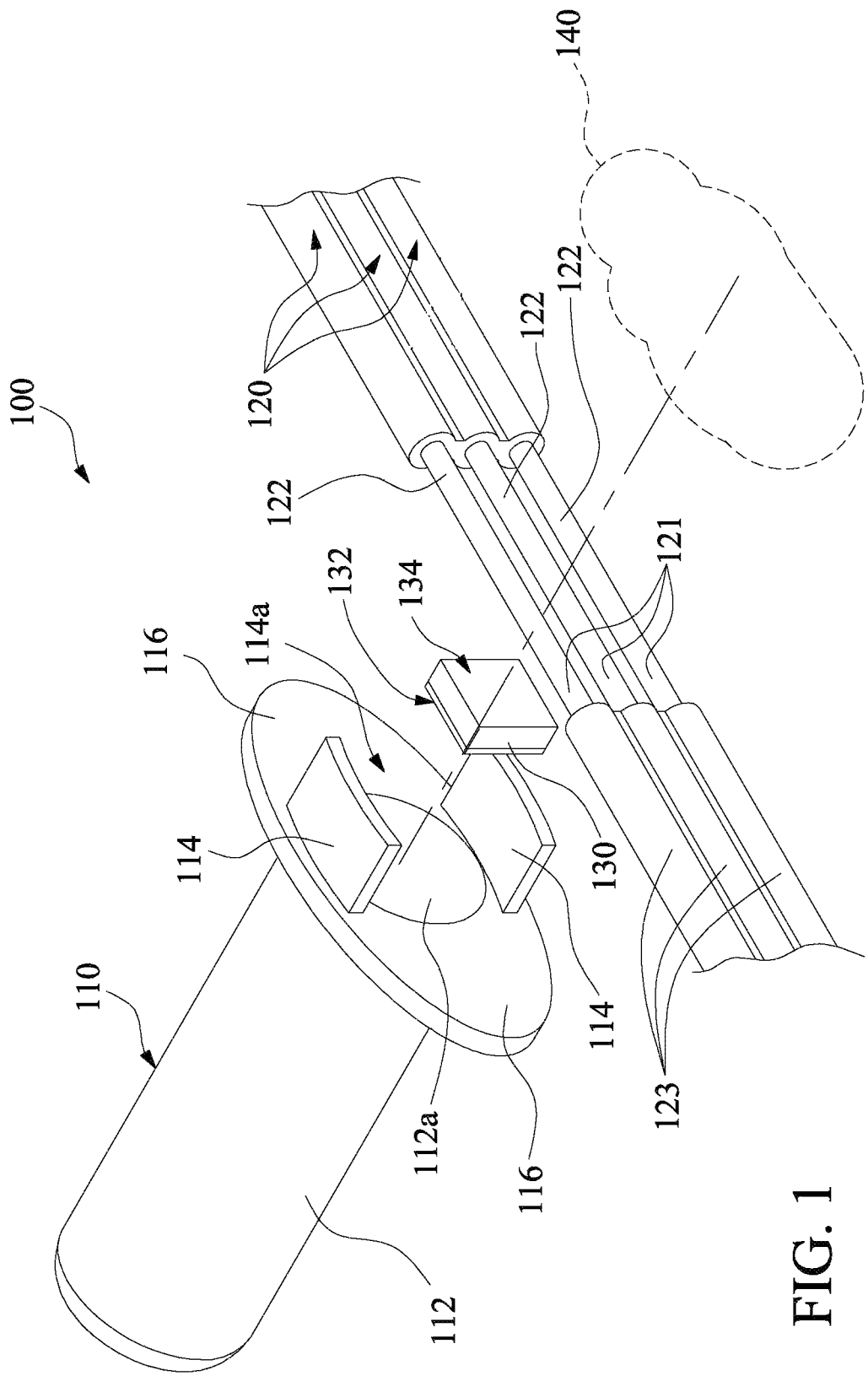
FIG. 1 is a three-dimensional exploded diagram of an embodiment of this disclosure.
Figure 2:
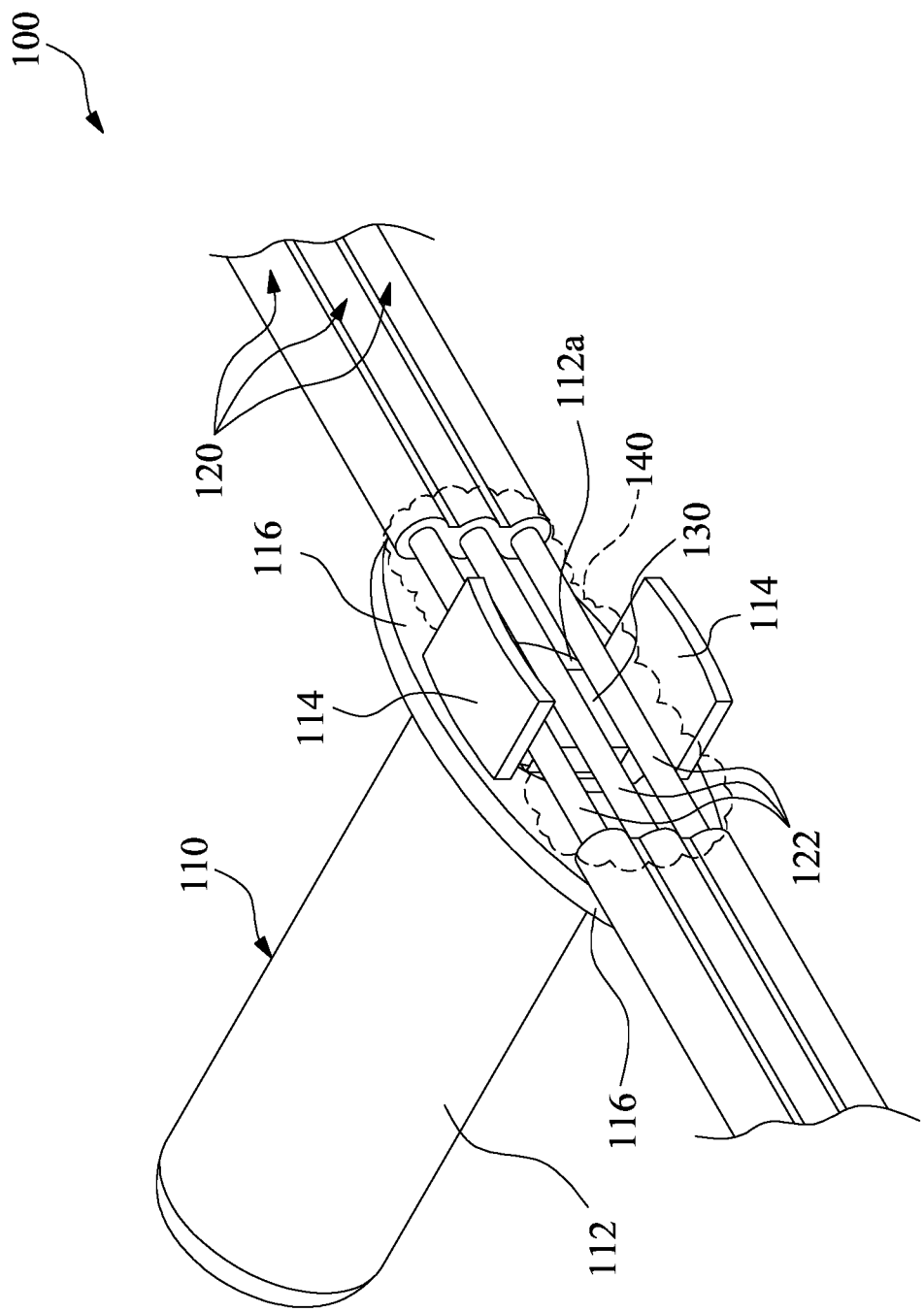
FIG. 2 is a three-dimensional diagram of an embodiment of this disclosure.
Figure 3:
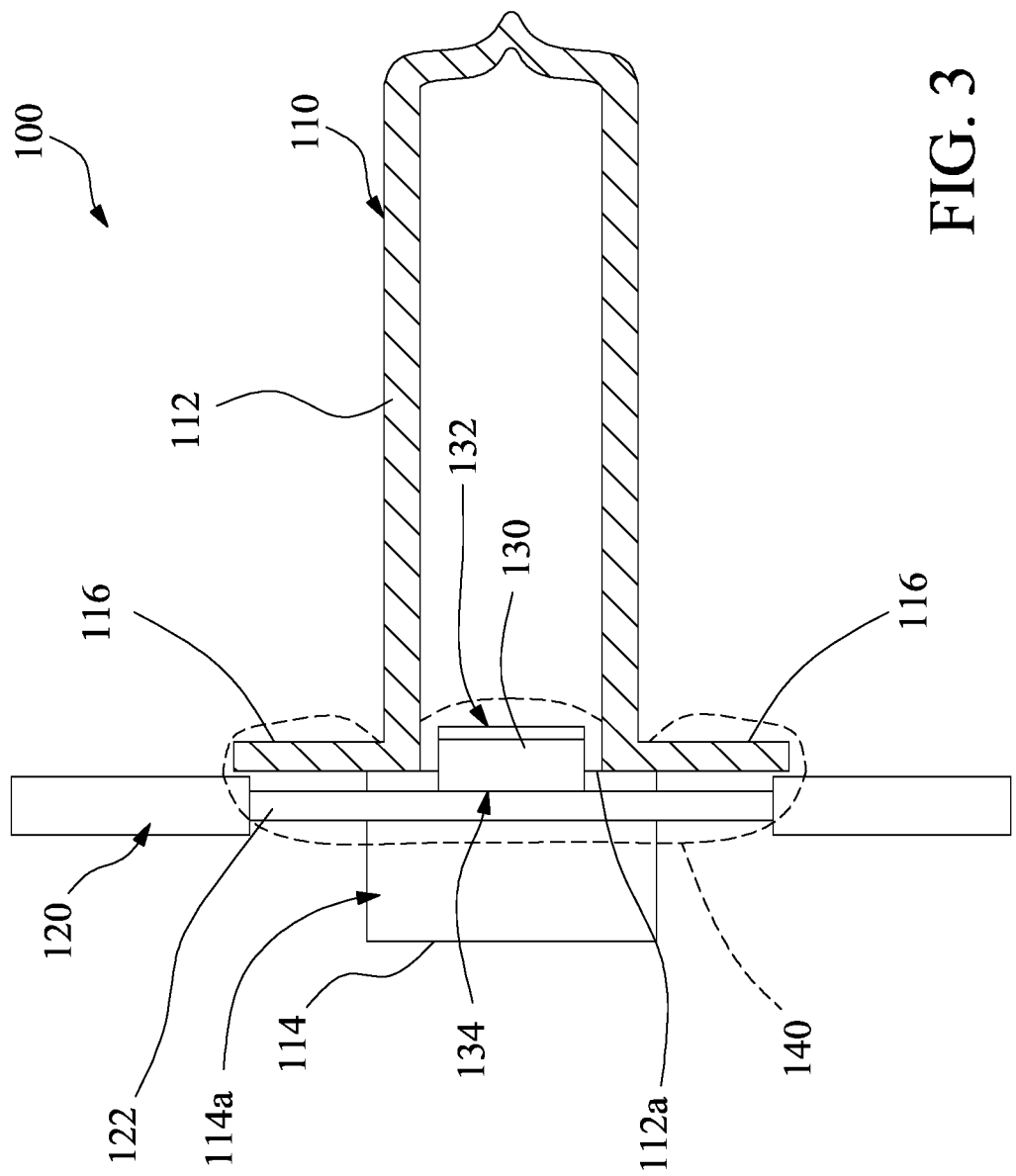
FIG. 3 is a cross-sectional schematic diagram of an embodiment of this disclosure.

Referring to FIG. 1, FIG. 2 and FIG. 3, a light string package assembly or lighting structure 100 disclosed by an embodiment of this disclosure is illustrated, and is used as one portion of a light string. The light string package structure 100 includes a light-transmitting cap 110, one or more wires 120, a light emitting diode 130 (LED 130) and a transparent adhesive 140.

As shown in FIG. 1, FIG. 2 and FIG. 3, the light-transmitting cap 110 is made of a light-transmitting material that may be transparent and colorless, or may be in any color to provide illuminating light in different colors. The light-transmitting cap 110 includes a body 112 and two guide pieces 114. The top of the body 112 may be in a lens form, and is used for refracting light to form a light condensation or scattering effect. The interior of the body 112 is hollow, and an opening 112a is formed in the bottom surface of the body 112 to communicate with the interior of the body 112.

As shown in FIG. 1, FIG. 2 and FIG. 3, the number of wires 120 may be in any quantity, and the quantity is determined according to an electric connection mode of the LED 130. In case of a series circuit, there may be only one wire 120, and two ends of the wire 120 are respectively connected to a power source and the ground. In case of a parallel circuit, there may be two wires 120: a power wire for supplying power and a ground wire. However, other electrical connection modes are not excluded. For example, when a programmable-controlled LED 130 is used, there will be a third wire 120 serving as a transmission line of a control signal. FIG. 1, FIG. 2 and FIG. 3 depict a 3-wire embodiment.

As shown in FIG. 1, FIG. 2 and FIG. 3, each wire 120 includes a conductor portion 121 and an insulating layer 123. Each conductor portion of each wire 120 has a soldering section 122 with an exposed metal core or conductor portion, and other conductor portions that are wrapped by the insulating layer such as a plastic layer or insulating paint-coating layer. That is, the wire 120 may be a plastic-covered wire, e.g., PVC-covered wire, or an enameled wire. When there are two or more wires 120 and the wires 120 are plastic-covered wires, the plurality of wires 120 may be connected side by side (parallel) via the plastic insulating layers to form a single wire assembly 120.

As shown in FIG. 1, FIG. 2 and FIG. 3, the LED 130 has a light emitting surface 132 and a soldering surface 134. A soldering pad is arranged on the soldering surface 134, and is used for soldering the LED 130 onto the soldering sections 122 of the wires 120, and the soldering surface 134 faces the wires 120.

As shown in FIG. 1, FIG. 2 and FIG. 3, a guide trench 114a is defined between the two guide pieces 114. The transparent adhesive 140 encapsulates or wraps around the soldering sections 122 of the wires 120 to affix the soldering sections 122 to the guide trench 114a and two lugs or flanges 116 of the light-transmitting cap 110, and extends to wrap around the light emitting surface 132 of the LED 130. The light-transmitting cap 110 covers the LED 130, so that the LED 130 is located at the opening 112a, and the light emitting surface 132 faces the interior of the body 112. Meanwhile, the transparent adhesive 140 attaches the LED 130 and the soldering sections 122 to the light-transmitting cap 110, so as to fix the light-transmitting cap 110 to the wires 120.

As shown in FIG. 1, FIG. 2 and FIG. 3, the two guide pieces 114 of the light-transmitting cap 110 are arranged in parallel and protrude from the bottom of the body 112, and the guide trench 114a is defined between the two guide pieces 114. The opening 112a is located between the two guide pieces 114, that is, the opening 112a is located in the guide trench 114a. The body 112 further includes a flange that includes two lugs 116 that inversely extend outward from the edge of the bottom of the body 112, and the two lugs 116 correspond to two ends of the guide trench 114a. In an embodiment, a distance between two ends of the two lugs 116 must be equal to or greater than a length of the soldering sections 122, so that the two lugs 116 may cover the whole soldering sections 122 to allow the transparent adhesive 140 to affix the soldering sections 122 and the wires 120 to the lugs 116.

The soldering sections 122 of the aforementioned wires 120 are located between the two guide pieces 114, and the transparent adhesive 140 may appropriately flow into the opening 112a and wrap around or contact the LED 130 to attach the soldering sections 122 of the wires 120 to the two guide pieces 114 and the edge of the opening 112a. The transparent adhesive 140 may use an adhesive or glue bulk with a curing function, such as an ultraviolet-curable adhesive that may be cured by ultraviolet radiation. Finally, the transparent adhesive 140 may exert a fixing or adhesive effect after being cured.

As shown in FIG. 1, FIG. 2 and FIG. 3, the two guide pieces 114 and the transparent adhesive 140 may achieve a movement-restricting effect on the soldering sections 122 in a horizontal direction, so as to avoid a soldering failure of the LED 130 due to bending of the soldering sections 122 in the horizontal direction. The two lugs 116 may achieve a movement-restricting effect on the soldering sections 122 in a vertical direction, so as to avoid the soldering failure of the LED 130 due to bending of the soldering sections 122 in the vertical direction.

Figure 4:
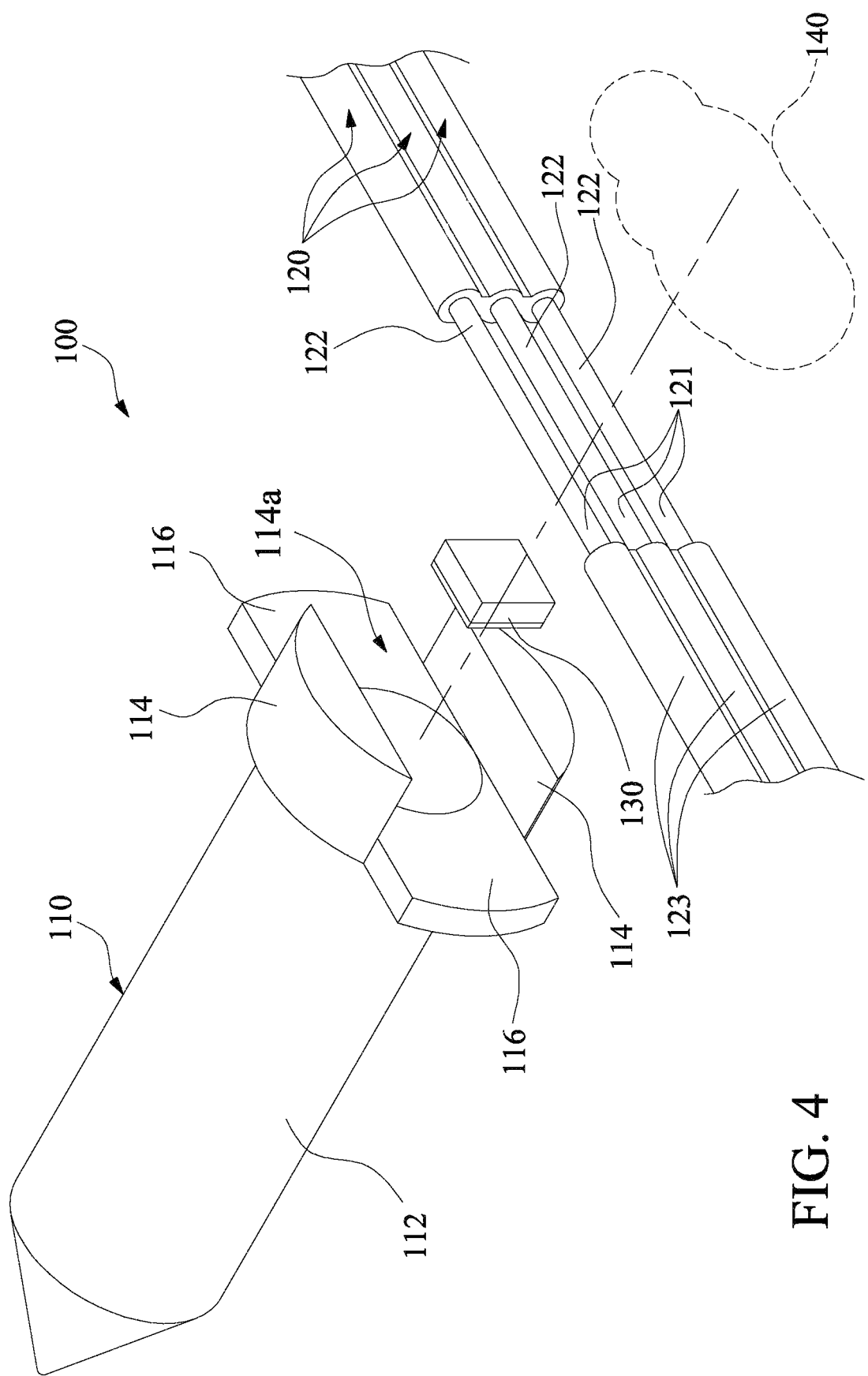
FIG. 4 is a three-dimensional exploded diagram of another embodiment of this disclosure.
Figure 5:
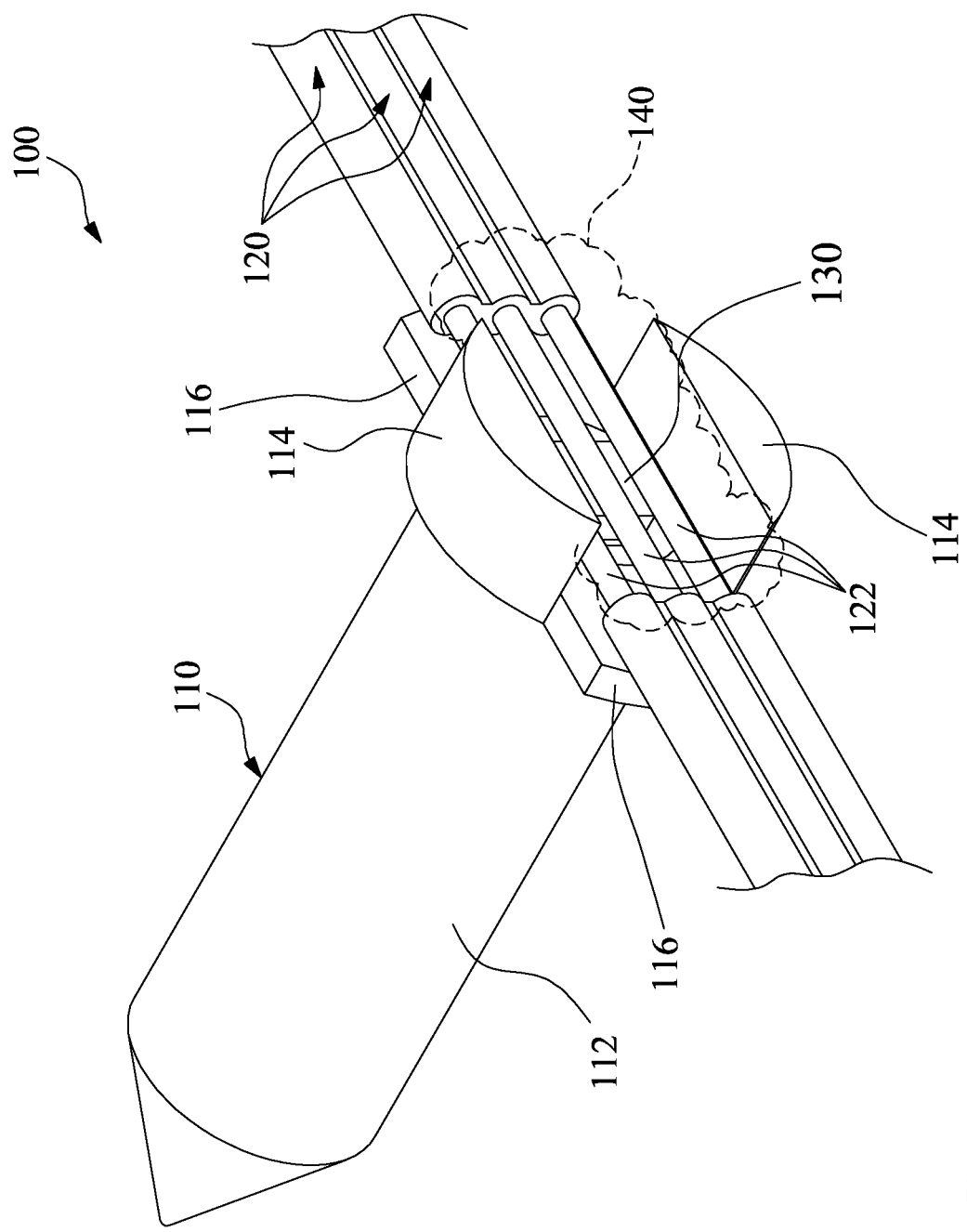
FIG. 5 is a three-dimensional diagram of another embodiment of this disclosure.

As shown in FIG. 4 and FIG. 5, a light string package structure 100 disclosed by another embodiment of this disclosure is illustrated. As shown in the figure, the thickness and width of two lugs 116 may vary, as long as a distance between two ends of the two lugs 116 is equal to or greater than a length of a soldering section 122 to allow the two lugs 116 to cover the whole soldering section 122.

Figure 6:
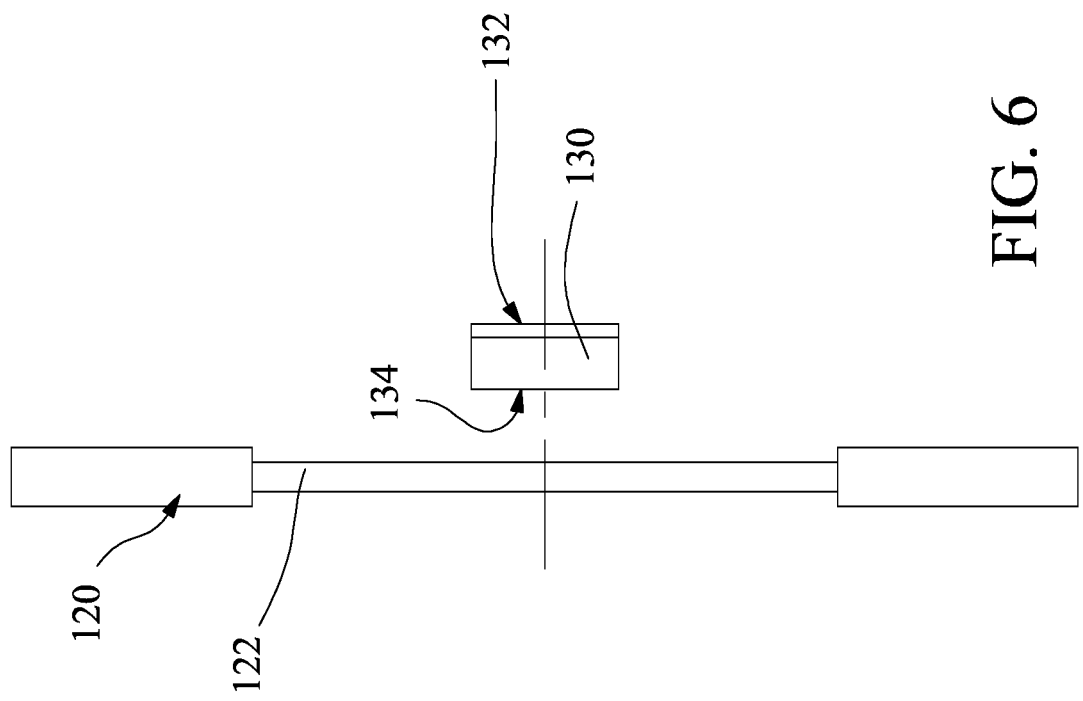
FIG. 6 and FIG. 7 are cross-sectional schematic diagrams of an embodiment of this disclosure, illustrating a processing method of a light string package structure.
Figure 7:
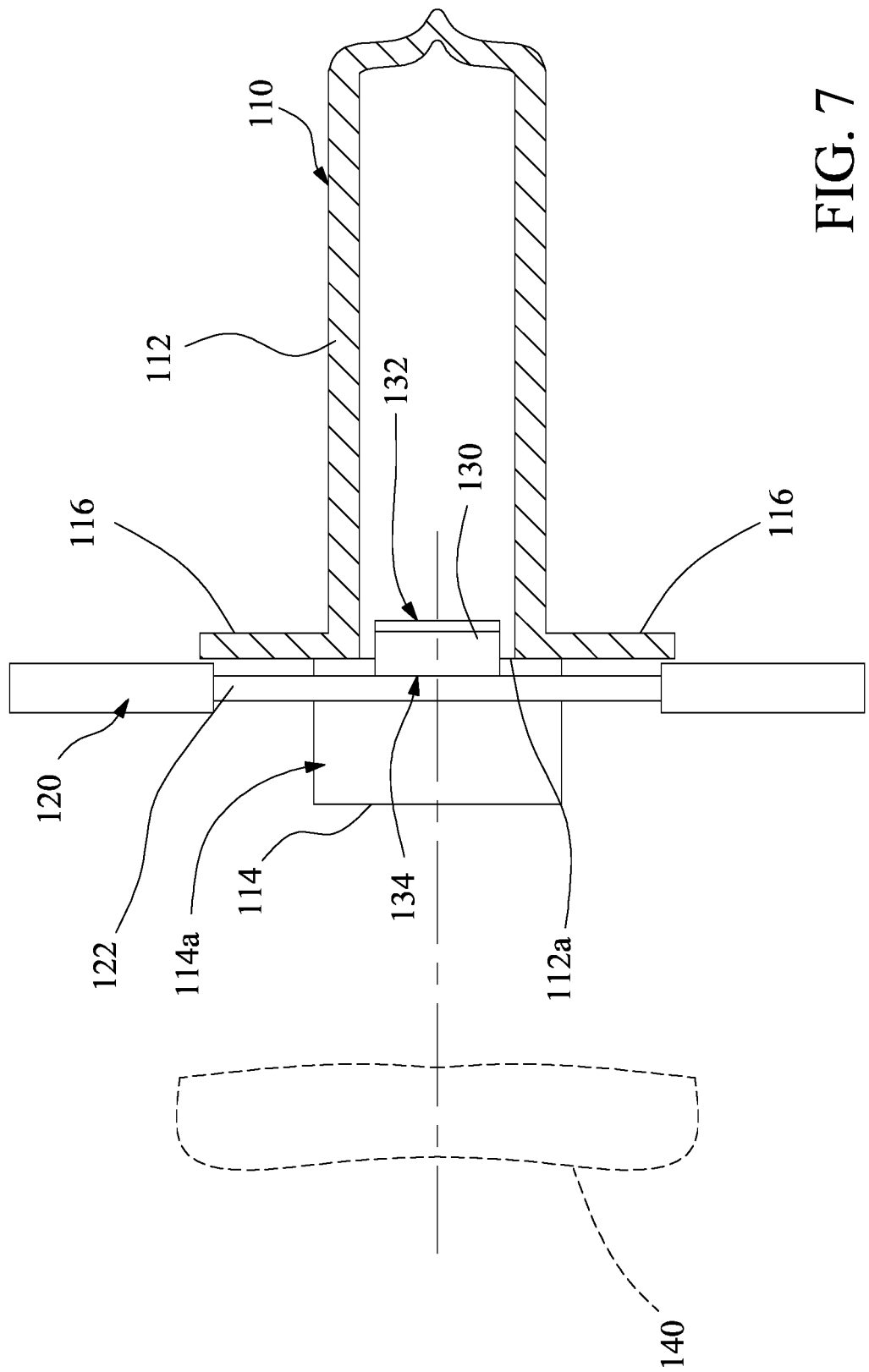
Figure 8:
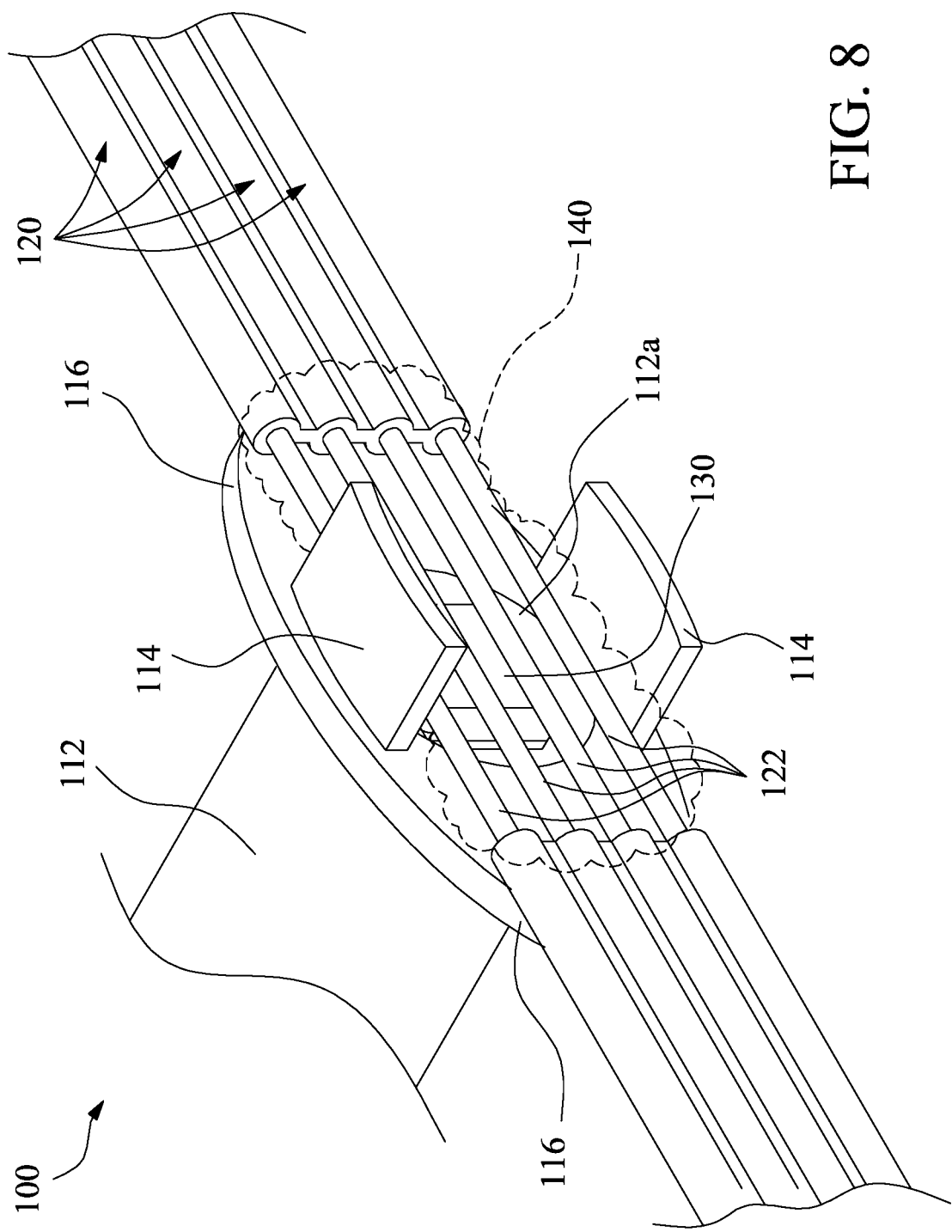
FIG. 8 and FIG. 9 are three-dimensional diagrams of different application cases of this disclosure.

As shown in FIG. 6, FIG. 7 and FIG. 8, an assembling method of a light string package structure 100 of this disclosure is illustrated.

As shown in FIG. 6, firstly, one or more wires 120 are prepared, and portions of insulating layers 123 such as plastic layers or insulating paint coating layer are removed by means of stripping, burning or grinding, cutting under tension, and so on, so as to form soldering sections 122. Secondly, a soldering surface 134 of a LED 130 is soldered to the soldering sections 122, the soldering sections 122 are flatly attached to the soldering surface 134, and a light emitting surface 132 faces a direction away from the soldering sections 122.

As shown in FIG. 7, an opening 112a of a body 112 is aligned with the LED 130, and the bottom of the body 112 covers the LED 130, so that the LED 130 is located at the opening 112a, and the light emitting surface 132 faces the interior of the body 112. Meanwhile, the wires 120 are located between two guide pieces 114.

As shown in FIG. 7, a transparent adhesive 140 is coated on a guide trench 114a and two lugs 116 so as to wrap the whole soldering sections 122. Furthermore, the transparent adhesive 140 may appropriately overflow to be attached between the edge of the opening 112a and the LED 130, between the soldering sections 122 and the two guide pieces 114, as well as between the soldering sections 122 and the bottom of the body 112.

As shown in FIG. 8, finally, the transparent adhesive 140 is cured. For example, an ultraviolet-curable adhesive is irradiated by ultraviolet radiation to complete the light string package structure 100. A plurality of soldering sections 122, LEDs 130 and light-transmitting caps are continuously disposed on the wires 120 to form a light string. The aforementioned procedure of disposing the plurality of soldering sections 122, LEDs 130 and light-transmitting caps may be a one-by-one arrangement or batch operation. For example, the soldering sections 122 are produced in batches, the LEDs 130 are soldered in batches, the light-transmitting caps are arranged in a coverage manner in batches, and gluing and curing are performed in batches.

Figure 9:
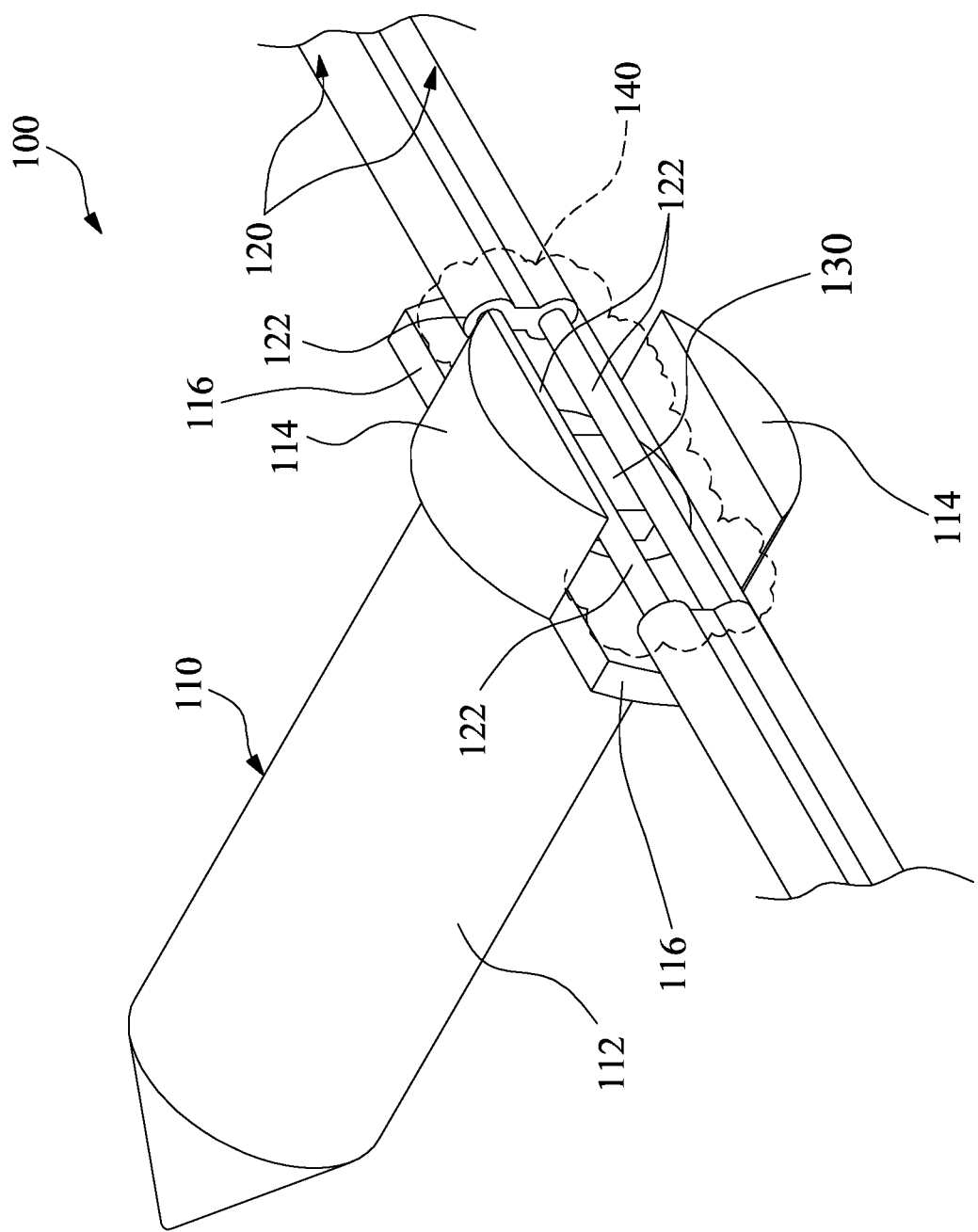

As shown in FIG. 8 and FIG. 9, in the first and second embodiments of this disclosure, the quantity of the wires 120 is not limited, that is, there may be two, three, four or an any quantity of wires, as long as the soldering sections 122 are located between the two guide pieces 114, and the transparent adhesive 140 attaches the LED 130 to the light-transmitting cap 110.

Figure 10:
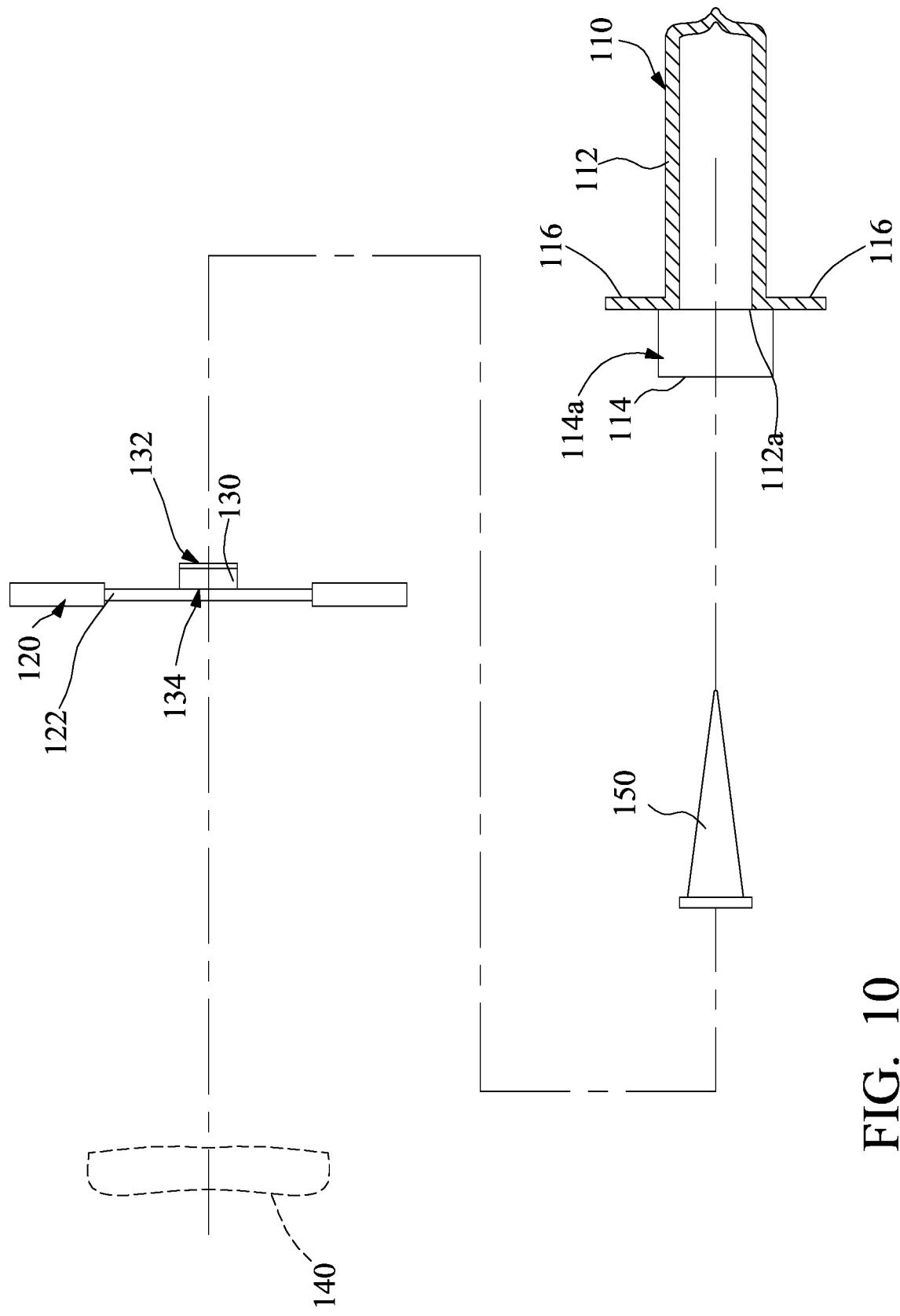
FIG. 10 is a cross-sectional exploded diagram of different application cases of this disclosure.
Figure 11:
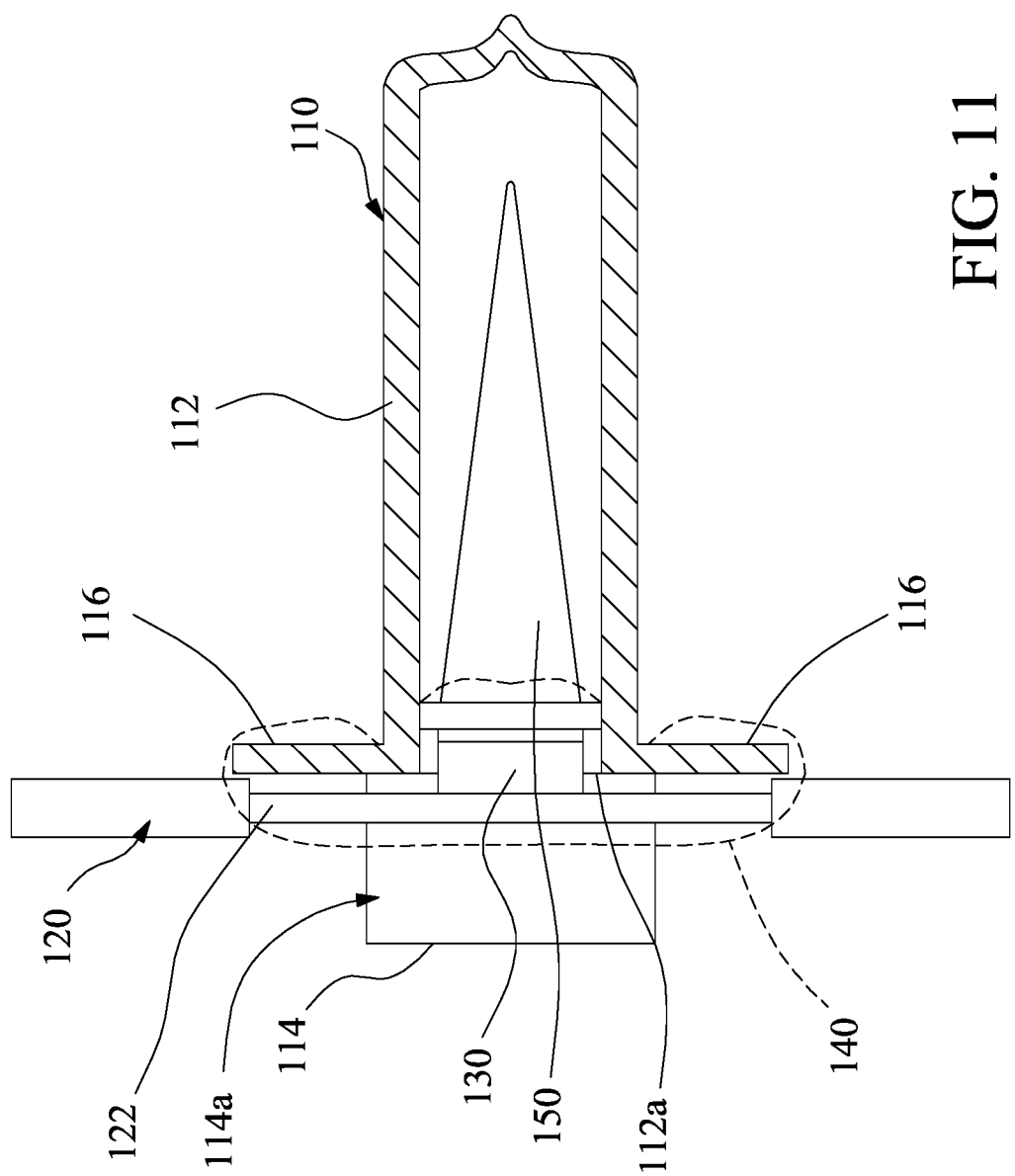

As shown in FIG. 10 and FIG. 11, in the first and second embodiments of this disclosure, the light string package structure 100 may further include a light guide 150. The light guide 150 is received into the body 112 through the opening 112a, and has one end facing the LED 130 to receive light and one end extending towards the front end of the body 112. The transparent adhesive 140 may appropriately overflow to be attached between the light guide strip 150 and the body 112 to fix the light guide strip 150.

Figure 12:
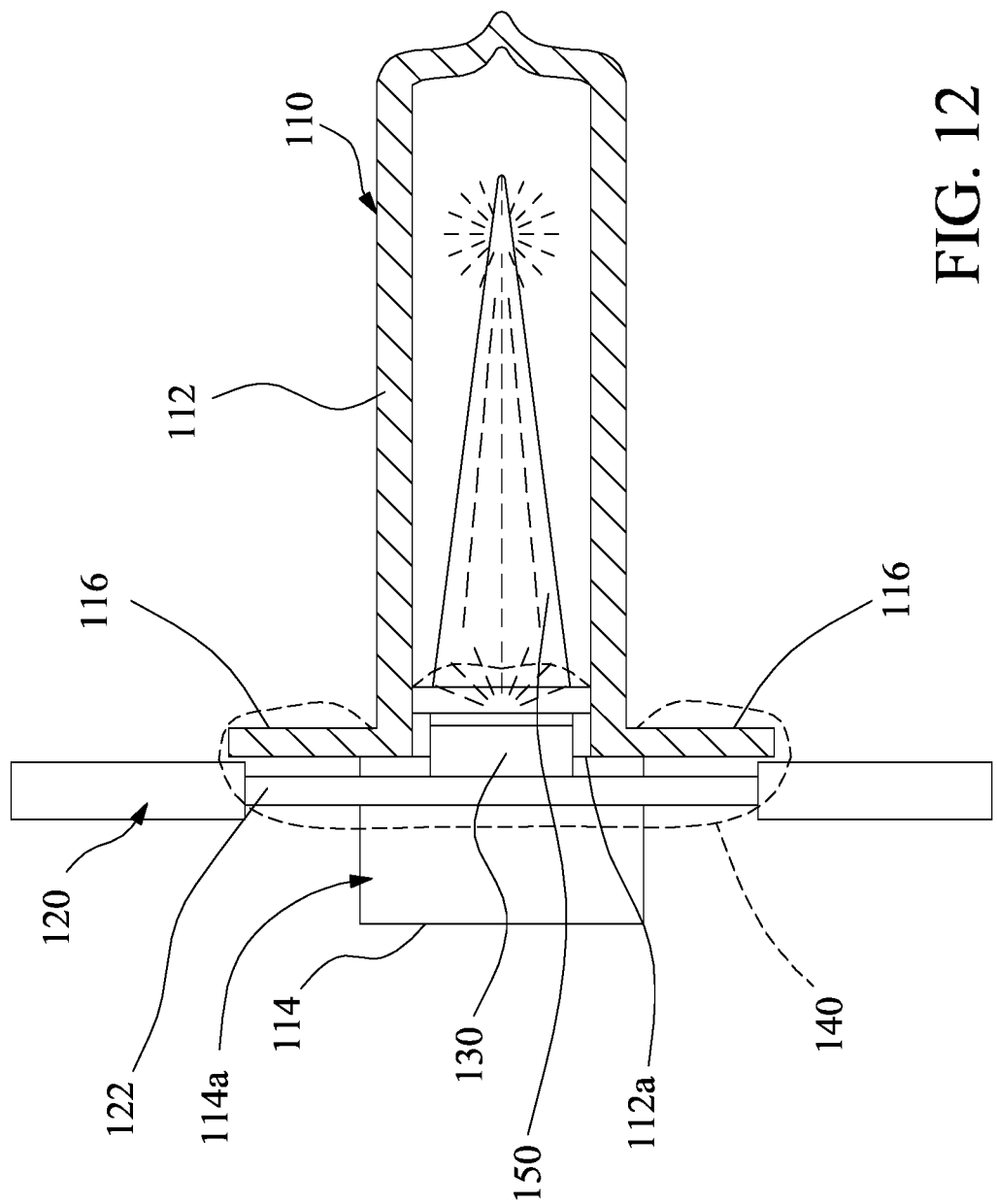

As shown in FIG. 12, when the LED 130 emits light, the light may be guided by the light guide 150 and uniformly emitted from the body 112 via the light guide 150, such that light emissions are concentrated at the opening 112a.

Referring to FIG. 13, the light guide 150 may be a cone or a cylinder, or may comprise columns with other cross section forms, as long as one end of the light guide 150 faces the LED 130 to receive the light, and the other end of the light guide strip 150 extends towards the front end of the body 112. In an embodiment, light guide 150 is a substantially solid structure, though in other embodiments, light 150 may include hollow portions to achieve a transmissive lighting effect that differs from a solid-material light guide.

By adopting the light string package structure 100, in addition to providing an optical effect through the light-transmitting cap, the fixing of the soldering sections 122 can be reinforced, thereby avoiding the soldering failure of the LED 130 due to the excessive bending of the soldering sections 122 in a use process of a light string.

What is claimed is:

1. A light string, comprising:
   a first wire extending along a lengthwise axis and including a first conductor and a first plurality of insulation portions, the first plurality of insulation portions covering portions of the first conductor, such that portions of the first conductor are insulated and portions of the first conductor are uninsulated, in an alternating pattern;
   a second wire extending parallel to the first wire and including a second conductor and a second plurality of insulation portions, the second plurality of insulation portions covering portions of the second conductor, such that portions of the second conductor are insulated and portions are uninsulated, in an alternating pattern, each uninsulated portion of the second conductor being adjacent to an uninsulated portion of the first conductor;
   a plurality of light emitting diodes (LEDs), each LED of the plurality of LEDs connected to one or more uninsulated portions of the first and second wires;
   a plurality of light-transmitting caps, each cap of the plurality of light-transmitting caps defining a cap cavity;
   a plurality of adhesive portions, each of the plurality of adhesive portions covering one of the plurality of LEDs and contacting an uninsulated portion of each of the first and second wires; and
   wherein each of the plurality of LEDs and a respective adhesive portion covering the LED is located within the cap cavity of the light-transmitting cap.

2. The light string of claim 1, wherein each of the plurality of LEDs faces upward and away from the uninsulated portions of the first and second wires into a cap cavity of one of the plurality of light-transmitting caps.

3. The light string of claim 1, wherein each of the plurality of LEDs and a respective adhesive portion covering the LED is located entirely within the cap cavity of the light-transmitting cap.

4. The light string of claim 1, wherein each of the plurality of adhesive portions is in contact with one portion of the first plurality of insulation portions covering portions of the first wire.

5. The light string of claim 4, wherein each of the plurality of adhesive portions is in contact with one portion of the second plurality of insulation portions covering portions of the second wire.

6. The light string of claim 5, wherein each cap cavity of each of the plurality of light-transmitting caps defines a height that is greater than a width.

7. The light string of claim 1, further comprising:
   a third wire positioned parallel to the first wire, the third wire including a third conductor and a third plurality of insulation portions, the third plurality of insulation portions covering portions of the third conductor, such that portions of the third conductor are insulated and portions are uninsulated, in an alternating pattern, each uninsulated portion of the third conductor being adjacent to an uninsulated portion of the first conductor.

8. The light string of claim 7, wherein one of the first, second, and third wires is configured to transmit LED control data.

9. The light string of claim 7, wherein the first insulating portions of the first, second, and third wires are integral to each other, such that the first, second, and third wire are joined by the first, second, and third insulating portions.

10. The light string of claim 9, further comprising a fourth wire arranged in parallel with the first, second, and third wires.

11. The light string of claim 1, wherein the light-transmitting cap includes a body portion, and a lower portion that forms a flat, flanged portion.

12. The light string of claim 1, wherein each of the plurality of adhesive portions contacts one of the plurality of LEDs, one of the plurality of light-transmitting caps, and an uninsulated portion of each of the first and second wires.

13. The light string of claim 12, wherein each of the plurality of adhesive portions contacts an insulated portion of each of the first and the second wires.

14. The light string of claim 12, wherein each of the plurality of adhesive portions contacts an exterior portion of one of the plurality of light-transmitting caps.

* * * * *